United States Patent [19]
Yamasaki et al.

[11] Patent Number: 6,150,518
[45] Date of Patent: Nov. 21, 2000

[54] PROCESS FOR PREPARING χ-FORM METAL FREE PHTHALOCYANINE

[75] Inventors: Yasuhiro Yamasaki; Kazuyoshi Kuroda, both of Neyagawa, Japan

[73] Assignee: Orient Chemical Industries, Ltd., Osaka, Japan

[21] Appl. No.: 09/174,005

[22] Filed: Oct. 16, 1998

[30] Foreign Application Priority Data

Oct. 16, 1997 [JP] Japan ................................... 9-283636

[51] Int. Cl.⁷ ........................ C09B 67/50; C09B 47/04; G03G 5/06
[52] U.S. Cl. .................. 540/141; 540/122; 540/140; 430/58; 430/78
[58] Field of Search ...................... 540/122, 140, 540/141; 430/58, 78

[56] References Cited

U.S. PATENT DOCUMENTS

| | | | |
|---|---|---|---|
| 3,357,989 | 12/1967 | Byrne et al. | 260/314.5 |
| 5,100,752 | 3/1992 | Hsaio et al. | 430/135 |
| 5,585,483 | 12/1996 | Tamura et al. | 540/142 |
| 5,824,800 | 10/1998 | Tamura et al. | 540/142 |

FOREIGN PATENT DOCUMENTS

| | | |
|---|---|---|
| 44-14106 | 6/1923 | Japan . |
| 45-8102 | 3/1970 | Japan . |
| 378872 | 12/1991 | Japan . |
| 585554 | 12/1993 | Japan . |
| 737588 | 4/1995 | Japan . |
| 7207184 | 8/1995 | Japan . |

*Primary Examiner*—Mukund J. Shah
*Assistant Examiner*—Pavanaram K Sripada
*Attorney, Agent, or Firm*—Birch, Stewart, Kolasch & Birch, LLP

[57] ABSTRACT

A process for preparing χ-form metal free phthalocyanine comprising: dry milling amorphous-like α-form metal free phthalocyanine to form χ-form metal free phthalocyanine partially; and wet milling or dispersing with stirring the resulting polymorph mixture in the presence of a cyclic organic solvent comprising an amide moiety. A simple process for preparing high-pure χ-form H2-Pc suitable as a charge generating meterial of an organic photoreceptor is provided, by improving the conventional technique for preparing χ-form H2-Pc.

7 Claims, 5 Drawing Sheets

Integrated intensity (CRYSTAL) = 18005.0
Integrated intensity (TOTAL) = 40817.4 calculated crystallinity = 44.1 %

Integrated intensity (CRYSTAL) = 15020.4
Integrated intensity (TOTAL) = 30672.9 calculated crystallinity = 49.0 %

PROCESS FOR PREPARING χ-FORM METAL FREE PHTHALOCYANINE

FIELD OF THE INVENTION

The present invention relates to a process for preparing χ-form metal free phthalocyanine. Specifically, the present invention relates to a process for preparing χ-form metal free phthalocyanine which is suitable as a charge generating meterial of an organic photoreceptor in which high sensitivity for semiconductor laser light is required.

BACKGROUND OF THE INVENTION

An electrophotographic photoreceptor have been widely applied to an electrophotographic apparatus such as a copying machine, a printer and the like. Semi-conductor laser ray may be generated with a compact and low-cost system, and it has been mainly used as a light source of the electrophotographic apparatus in recent years. Therefore, an organic photoconductive substance (OPC) which is sensitive to semi-conductor laser ray (about 800 nm), has been a matter of interest as a material for an electrophotographic photoreceptor in the art, and investigation about OPC has been made energetically.

OPC is the material in which a charge generating meterial having photoconductivity is dispersed into a binder consisting of an organic resin. By forming OPC in the form of layer on a conductive support, an electrophotographic photoreceptor is obtained. This type of electrophotographic photoreceptor is referred to as an organic photoreceptor. As the charge generating meterial, a functional colorant having photoconductivity such as a stable or metastable phthalocyanine compound is generally employed.

The phthalocyanine compound generally has wide spectrosensitivity over a long wavelength region, good charge generating efficiency, good fastness, high sensitivity, and high durability. Therefore, a metal free phthalocyanine or a metal phthalocyanine compound such as χ-form metal free phthalocyanine, titanylphthalocyanine, and vanadylphthalocyanine has been applied to the organic photoreceptor.

The metal free phthalocyanine does not contain metal, and it is safe, stable and easy to be prepared. Specifically, sensitivity of χ-form metal free phthalocyanine is better than that of α-form or β-form metal free phthalocyanine, and the χ-form metal free phthalocyanine is practically used as a charge generating meterial.

The χ-form metal free phthalocyanine (hereinafter, referred to as "H2-Pc") is generally prepared by milling (grinding) and/or solvent treating the α-form or the β-form H2-Pc to transform the polymorph thereof. However, the conventional process has required a long period of time for transforming the polymorph. In addition, the resulting χ-form H2-Pc is not satisfactory pure, and it contains untransformed H2-Pc in the amount that a peak thereof is found at an X-ray diffraction spectrum (hereinafter, referred to as "XRD spectrum").

U.S. Pat. No. 3,357,989 specification discloses a process for preparing χ-form H2-Pc in which the commercially available α-form or β-form H2-Pc is dry milled for a long period. The process requires dry milling over not less than 48 hours in order to transform α-form or χ-form to χ-form, or dry milling of up to 144 hours in order to further increase the transformation rate.

Japanese Patent Kokoku Publication No. 14106/1969 discloses a process for preparing χ-form H2-Pc in which H2-Pc pigment is subjected to acid pasting, and it was then dry milled. However, the process does not steadily provide the χ-form polymorph, as shown in the following Comparative Example 1.

Japanese Patent Kokoku Publication No. 8102/1970 discloses a process for preparing χ-form H2-Pc in which a small amount of χ-form H2-Pc is added to the commercially available α-form H2-Pc to seed, and the resulting mixture is wet milled in a ketone solvent such as methyl ethyl ketone. However, the process often provides β-form H2-Pc.

Japanese Patent Kokoku Publications No. 78872/1991, 85554/1993, and 37588/1995 disclose a process for preparing χ-form H2-Pc in which the amorphous-like α-form H2-Pc obtained by acid pasting the H2-Pc which is previously synthesized is dry milled, or the high-purified H2-Pc is dry milled.

For example, Japanese Patent Kokoku Publication No. 78872/1991 discloses a process for preparing high-pure χ-form H2-Pc in which phthalonitrile is reacted in the presence of a strong base (DBU) to form H2-Pc (β-form), the resulting crude reaction product is made soluble to a solvent (for example, it is complexed to dipotassiumphthalocyanine diglyme), the resulting soluble substance is purified with a solvent, the resulting purified soluble substance is restored to obtain high-pure H2-Pc, and the high-pure H2-Pc is ball milled. However, the process is complicated in that the high-pure H2-Pc have to be prepared previously by the steps of making soluble to a solvent and purifying.

Japanese Patent Kokoku Publication No. 37588/1995 discloses a process for preparing χ-form H2-Pc in which the α-form H2-Pc which is obtained by acid pasting, is dry milled to obtain the mixture of α-form H2-Pc and χ-form H2-Pc, a ketone containing organic solvent is added to the mixture to obtain χ-form H2-Pc. The χ-form H2-Pc obtained by the process shows rather good photoconductivity, but is not sufficient (Comparative Example B).

Japanese Patent Kokoku Publication No. 85554/1993 discloses a process similar to that disclosed in Japanese Patent Kokoku Publication No. 78872/1991 in which, for example, the H2-Pc having the polymorph different from χ-form and a purity of not less than 95% is ground without a solvent (dry milled) in the form of powder at a temperature of 40 to 12° C. by using a grinding machine (mill medium mixing type). The process aims at obtaining a high-pure substance, but the resulting χ-form H2-Pc often contains a minor amount of untransformed α-form H2-Pc (Comparative Example 3), and the characteristics thereof as a charge generating meterial are insufficient as shown in the following Comparative Example C.

SUMMARY OF THE INVENTION

The present invention solves the conventional problems, and aims at providing a simple process for preparing high-pure χ-form H2-Pc suitable for a charge generating meterial of an organic photoreceptor, by improving the conventional technique for preparing χ-form H2-Pc.

The inventors of the present invention had found the problems present in the conventional process for preparing χ-form H2-Pc, that was, a long period of time was required in order to transform polymorph. Therefore, the inventors disclosed improved process for preparing χ-form H2-Pc in Japanese Patent Application No. 4423/1994 (Japanese Patent Kokai Publication No. 207184/1995. The process disclosed herein is that crude H2-Pc is subjected to acid pasting to obtain amorphous H2-Pc, the amorphous H2-Pc is dry-milled to partially form in the polymorph system the χ-form H2-Pc which becomes a core for the crystal growth, thereafter the mixture is wet milled or simply dispersed with stirring in various kinds of organic solvents. The process provides χ-form H2-Pc having good photoconductive properties.

However, the inventors further investigated the above described process and found that photoconductive property and stability of the resulting χ-form H2-Pc is remarkably improved by using the cyclic amide-type organic solvent comprising an amide moiety as an organic solvent for the step of wet milling.

Thus, the present invention provides a process for preparing χ-form H2-Pc comprising:
dry milling amorphous-like α-form H2-Pc to form χ-form H2-Pc partially; and
wet milling or dispersing with stirring the resulting polymorph mixture in the presence of a cyclic organic solvent comprising an amide moiety.

DETAILED DESCRIPTION OF THE INVENTION

Figure 1:
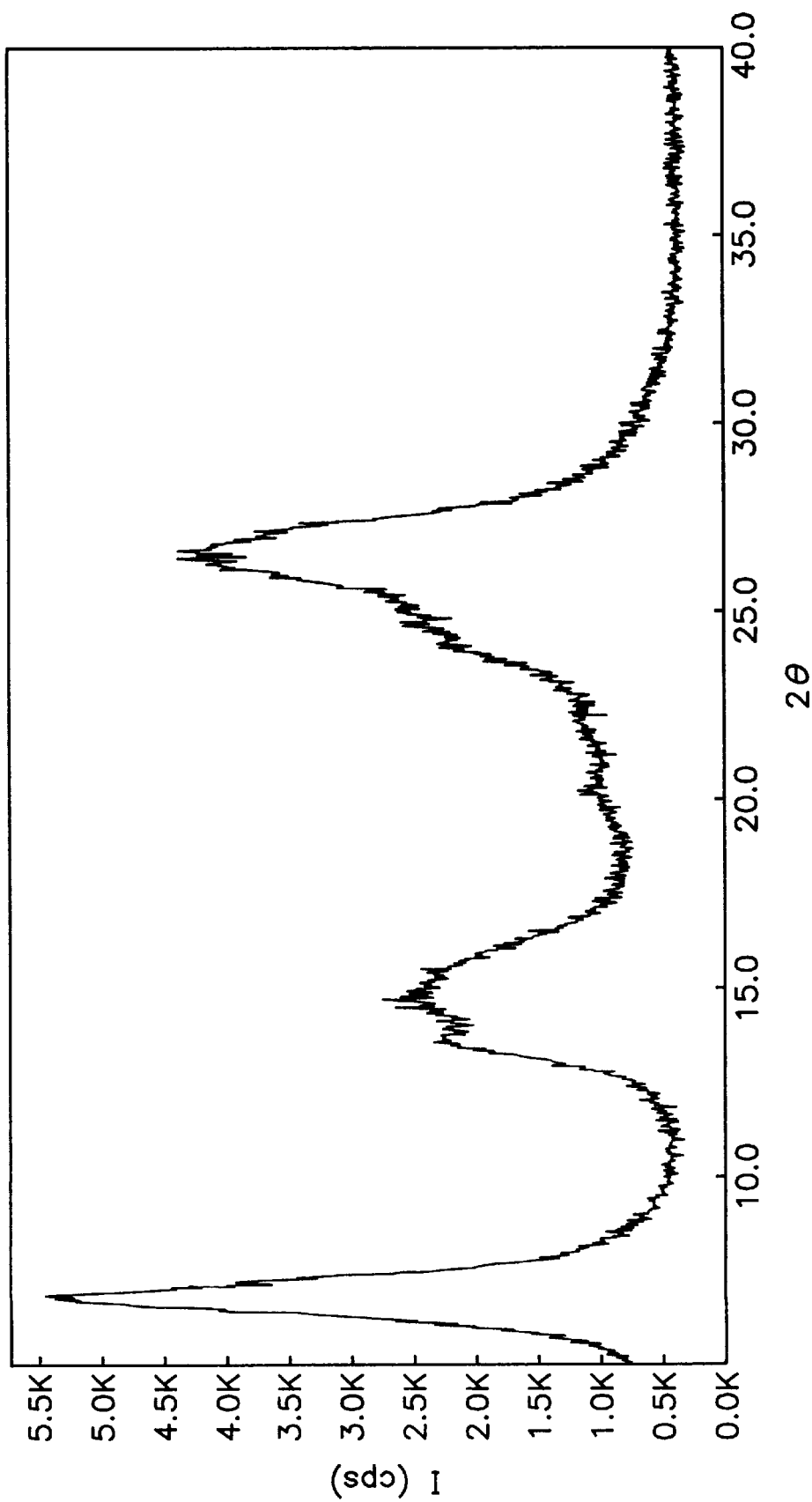
FIG. 1 is an XRD spectrum of amorphous-like α-form H2-Pc, which is prepared in Synthesis Example 2.

The amorphous-like α-form H2-Pc employed as a raw material in the process of the present invention is that in which the crystallized degree over the Bragg angle (2θ) range of from 5° to 40° is not more than 50%. If the amorphous degree of the amorphous-like α-form H2-Pc is insufficient, χ-form pure crystal is not obtained, crystal mixture likely to be obtained, and is not preferred. The crystallized degree of the amorphous-like α-form H2-Pc employed is the value which is measured by using the multiplex peak separation method.

The amorphous-like α-form H2-Pc is obtained by the process in which H2-Pc (for example, β-form H2-Pc) is dissolved in sulfuric acid, the acid pasting is conducted, followed by purifying and restoring. In another words, the crystal of H2-Pc usually becomes amorphous-like α-form when the H2-Pc is subjected to acid pasting.

The term "acid pasting" used herein means a method for purifying and fining an organic pigment by the steps of: dissolving it in concentrated sulfuric acid; and introducing the solution in ice/water to precipitate the organic pigment. The amount of the concentrated sulfuric acid and concentration of the sulfuric acid solution are not specifically limited. However, the concentrated sulfuric acid employed for acid pasting has a concentration of preferably 80 to 100%, more preferably 95 to 100%. When the concentration of the concentrated sulfuric acid is smaller than 80%, fining of the phthalocyanine becomes insufficient. The amount of the concentrated sulfuric acid may be controlled in order to give a paste suitable for purifying and fining H2-Pc, and generally is 1 to 100, preferably 5 to 50 times by weight based on the H2-Pc.

The H2-Pc employed for the acid pasting is not limited by the polymorph thereof. However, it is preferred the H2-Pc has high-purity sufficient to employ as a charge generating meterial. The H2-Pc prepared by the phthalonitrile method is preferred.

The phthalonitrile method is the process in which phthalonitrile is reacted in an alcoholic solvent such as n-amyl alcohol, n-hexyl alcohol, 1-methoxyethanol, 1-ethoxyethanol in the presence of a strong base such as DBU (1,8-diazabicyclo[4,3,0]undecene-7), DBN (1,5-diazabicyclo[4,3,0]nonene-5), and (metal) alkoxide, followed by hot filtering to obtain crude β-form H2-Pc, the crude β-form H2-Pc is purified by washing and/or redispersing with an organic solvent such as hot DMF (for example, for two hours at the reflux temperature) to obtain pure β-form H2-Pc.

In the process of the present invention, the amorphous-like α-form H2-Pc (the raw H2-Pc) is dry milled by first. The term "mill" or "milling" used herein means a method for crushing a substance into small pieces by mechanical force, that is, grinding. The term "dry mill" or "dry milling" used herein means a milling in a dry condition without using a solvent.

A dispersing apparatus and a mill medium is generally employed in milling procedure of the present invention. Examples of the preferred dispersing apparatus include a ball mill, a sand mill, a paint shaker, a disperser and an agitator. Examples of the preferred mill medium include glass beads, steel beads, zirconia beads, alumina ball having a diameter of 1 mm to 10 mm.

The dry milling is conducted preferably for about 1 to 48 hours, particularly 10 to 20 hours by using spherical glass mill medium having a diameter of 2 to 5 mm in an weight ratio of the sample based on the mill medium of from 3:100 to 8:100 under a frequency of about 500 to 1000 cpm. When the period of the dry milling is less than 1 hour, the following dispersing step becomes very long, or purity of the resulting χ-form H2-Pc becomes low. When the period of the dry milling is more than 48 hours, no significant effect is provided. A part of the raw H2-Pc is transformed into the χ-form H2-Pc by this dry milling step.

In one embodiment of the present invention, the raw H2-Pc is dry milled by the steps of: introducing about 5 parts by weight of the raw H2-Pc and about 100 parts by weight of 3 mmφ glass beads into a 100 ml glass or porcelain vessel; and shaking the vessel using a dispersing apparatus (e.g., a paint shaker).

The dry milled raw H2-Pc is then dispersed in an organic solvent. The term "disperse" or "dispersing" used herein means a method for floating a solid particle in a liquid by applying shear force to provide a slurry of the solid and the liquid.

A stirring apparatus such as a mechanical stirrer is generally employed in dispersing procedure of the present invention. The dispersing procedure may be conducted, for example, in a stirring speed of about 20 to 60 rpm at room temperature. In one embodiment of the present invention, after the step of dry milling, an organic solvent was introduced directly to the vessel containing the dry milled raw H2-Pc, and the step of wet milling is conducted according to the same manner as the step of dry milling except for using the solvent.

The amount of organic solvent for dispersing is about 5 to 50, preferably 10 to 25 times by volume based on weight of the H2-Pc. When the amount of the organic solvent is less than 5 times by volume, efficiency of the transformation becomes poor. On the other hand, when the amount is more than 50 times by volume, density of the slurry becomes low and the dispersing step becomes very long.

The organic solvent employed in the dispersing step is preferably a cyclic organic solvent comprising an amide moiety. By using the cyclic organic solvent, efficiency of the transformation (yield) becomes good. The cyclic organic solvent preferably employed in the present invention is those having 4 to 20 carbon atoms, particularly 4 to 10 carbon atoms.

The amide moiety of the cyclic organic solvent comprising an amide moiety is represented by the formula:

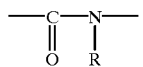

wherein R represents a hydrogen atom, an alkyl group having 1 to 5 carbon atoms (for example, a methyl group, an ethyl group, a propyl group, a butyl group, and an amyl group), a hydroxyalkyl group having 1 to 5 carbon atoms (for example, a hydroxyethyl group, and a hydroxypropyl group), and the like.

Specific examples of the preferred cyclic organic solvent comprising an amide moiety include N-methyl-2-pyrrolidone represented by the formula:

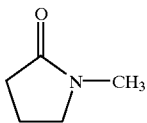

N-(2-hydroxyethyl)-2-pyrrolidone represented by the formula:

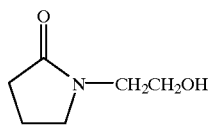

2-pyrrolidone represented by the formula:

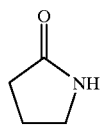

2-piperidone represented by the formula:

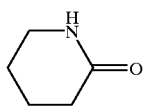

N-methyl-2-piperidone represented by the formula:

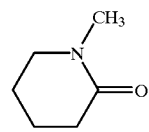

1,3-dimethyl-2-imidazolidinone represented by the formula:

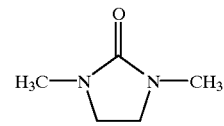

The dispersing or wet milling step is continued for about 1 to 48 hours, preferably 5 to 48 hours. When the period is less than 1 hours, efficiency of the transformation becomes poor. On the other hand, even when the period is more than 48 hours, no significant effect is provided. The raw H2-Pc is completely transformed into the χ-form H2-Pc by this dispersing or wet milling step. The wording "completely transformed into the χ-form H2-Pc" used herein means that the raw H2-Pc is transformed into the χ-form H2-Pc having such a purity that the resulting χ-form H2-Pc shows no peak belongs to the raw H2-Pc such as α-form or β-form in its XRD spectrum.

The following is one embodiment of the present invention.

(a) About 30 g of the crude synthesized β-form H2-Pc obtained by reacting phthalonitrile in the presence of a strong base (DBU) is dissolved in 1500 g of conc. sulfuric acid; the conc. sulfuric acid solution is poured into a large amount (0.8 L) of ice/water; the precipitate is filtered, washed with water, and dried to obtain amorphous-like α-form H2-Pc preferably having a crystallized degree of not more than 50% (raw H2-Pc)

(b) 3 g of the resulting amorphous-like α-form H2-Pc and about 120 g of mill medium is subjected to dry milling for about 1 to 48 hours by using a paint shaker and the like, and a core of the χ-form is partially generated and grown in the polymorph system.

(c) 50 ml of the cyclic organic solvent comprising an amide moiety (for example, N-methyl-2-pyrrolidone) is added to the polymorph system, wet milling is conducted for about 1 to 48 hours to transform completely to χ-form.

In order to decide a timing for shifting from step (b) to step (c), formation ratio of the χ-form H2-Pc in the polymorph system is measured. The formation ratio of the χ-form H2-Pc is determined from the peak intensity ratio (r) at a Bragg angle (2θ) of 6.7° based on 9.0° in the XRD spectrum of the sample during step (b).

Figure 3:
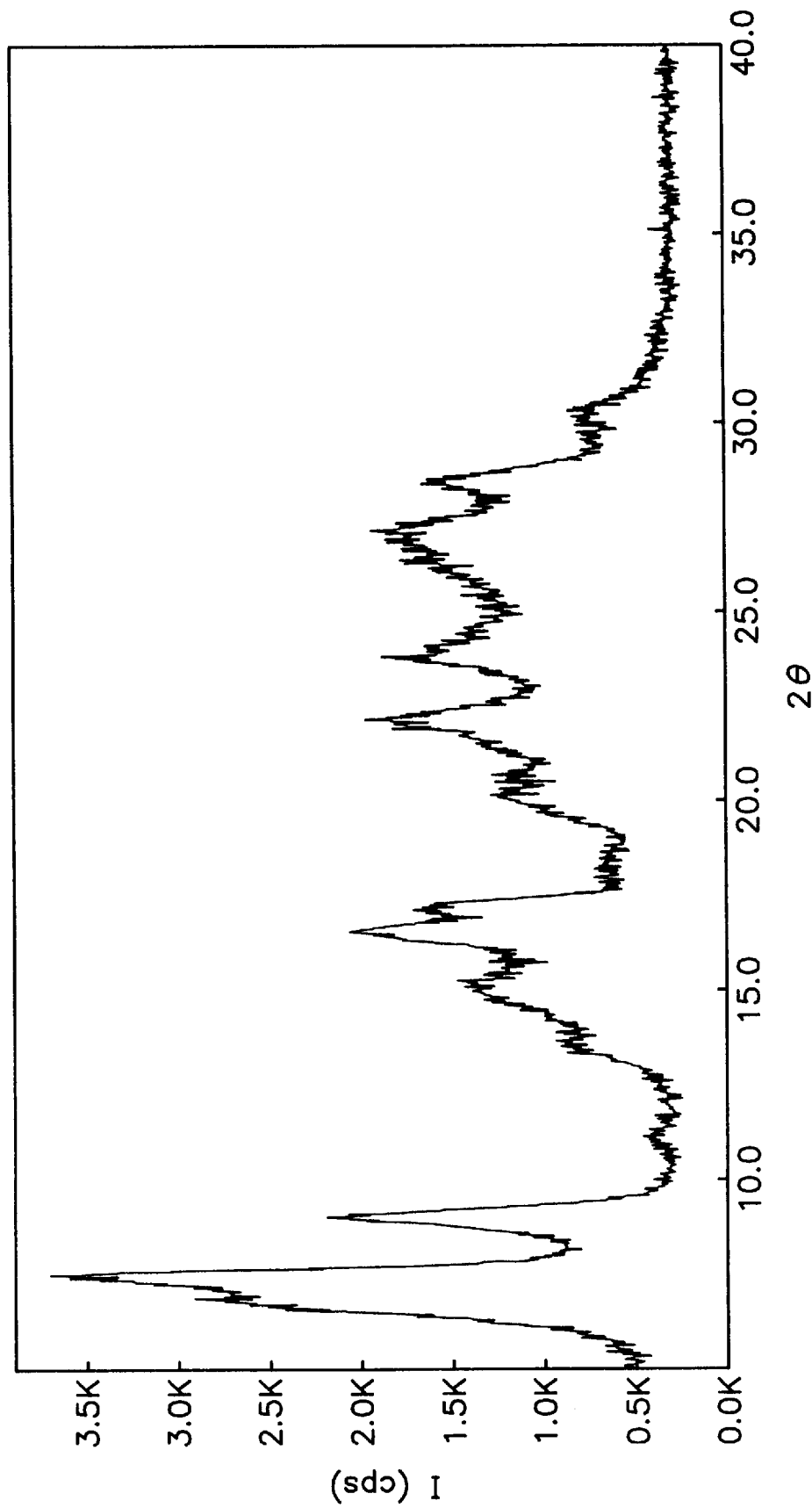
FIG. 3 is an XRD spectrum on the way from "amorphous-like α-form" to "χ-form" polymorph.

The peak intensity ratio (r) is represented as $I_\chi/I_\alpha$, herein $I_\alpha$ represents the peak intensity at a Bragg angle (2θ) of 6.7° which is the characteristic peak derived from α-form H2-Pc, and $I_\chi$ represents the peak intensity at a Bragg angle (2θ) of 9.0° which is the characteristic peak derived from χ-form H2-Pc. In this embodiment, step (b) which is dry milling step is shifted to step (c) which is wet milling step when the value of $I_\chi/I_\alpha$ becomes not less than 0.5. It is preferred that step (b) is shifted to step (c) such a timing, for example, when XRD spectrum becomes as shown in FIG. 3.

According to the process of the present invention, high-pure χ-form H2-Pc having a purity which is difficult to achieve by the conventional process, that is, the χ-form H2-Pc having a purity of not less than 99% is prepared in high yield. Specifically, the process in which both the dry milling and the wet milling are employed, does not require the step for transferring the sample to another vessel, and the procedure becomes simple.

Furthermore, in the process of the present invention, there is no need to make up beforehand the χ-form H2-Pc for use in seeding the amorphous-like α-form H2-Pc (what is called a crystal growth core). The reason for this is that the amorphous-like α-form H2-Pc is partially transformed to χ-form by the step of dry milling. The χ-form H2-Pc is not the one added from outside of the polymorph system, but the one transformed from the α-form H2-Pc in the polymorph system. Therefore, the χ-form H2-Pc also effectively contributes to the crystal transformation during the step of wet milling conducted subsequent to the step of dry milling. As a result, back-transformation to "α-form", or side-transformation to "β-form" or to the other sub-stable polymorph does not occur.

The χ-form H2-Pc obtained by the process of the present invention is useful as a charge generating meterial of an organic photoreceptor. The organic photoreceptor containing the χ-form H2-Pc of the present invention has good electrifying ability, and shows high sensitivity and high durability.

The organic photoreceptor is prepared for example by laying a charge generating layer and a charge transporting layer on a conductive support. The organic photoreceptor of this type is generally referred to as a function separated type photoreceptor, and it generally has the advantage in which the generated charge is efficiently transported to a surface of the photoreceptor. As the conductive support, metal such as aluminium, and nickel, a metal-deposited film, and the like are employed. The conductive support is generally made up to the form of drum, sheet, or belt.

The function separated type photoreceptor is for example prepared by the process in which a charge generating layer which comprises the χ-form H2-Pc of the present invention as a charge generating meterial (CG material) is formed as a thin film on the conductive support. The charge generating layer may be formed by depositing onto the conductive support, otherwise more generally, it is prepared by the process in which a coating liquid containing a bond resin dissolved in a solvent and the charge generating meterial dispersed therein are prepared by first, and the coating liquid is coated on the support, followed by drying.

The H2-Pc may be dispersed into the coating liquid using a usual dispersing apparatus such as a ball mill, a sand mill, a paint shaker, and the like.

The step for coating the coating liquid is not specifically limited, and suitably include bar coating, dip coating, spin coating, roller coating, and the like. The coated layer may be dried at a temperature of 30 to 200° C. for 5 minutes to 2 hours with or without air blowing.

A solvent optionally be employed for preparing the coating liquid. The solvent may be any one which dissolves the binding resin but does not dissolve the H2-Pc, and provides a uniform dispersion. Examples thereof include alcoholic solvents such as methanol, ethanol, isopropanol, and butanol; aromatic solvents such as toluene, xylene, and tetralin; halogenated solvents such as dichloromethane, chloroform, trichloroethylene, and carbon tetrachloride; ester solvents such as ethyl acetate, and propyl acetate; ether solvents such as ethylene glycol monoethyl ether, dioxane, and tetrahydrofuran; dimethyl formamide, and dimethyl sulfoxide.

The binding resin can be selected from a wide range of insulating resins. Examples of the preferred resin include condensation resins such as polycarbonate, polyacrylate, polyester, and polyamide; addition polymers such as polystyrene, styrene-acrylic copolymer, polyacrylate, polymethacrylate, polyvinyl butyral, polyvinyl alcohol, polyacrylonitrile, polyacrylic-butadiene copolymer, polyvinyl chloride, and vinyl chloride-vinyl acetate copolymer; organic photoconductive resins such as poly-N-vinyl carbazole, and polyvinylanthracene; polysulfone, polyether sulfone, silicone resin, epoxy resin, and urethane resin. These are used alone or in combination thereof.

The binding resin is employed in an amount of from 0.1 to 3 ratio by weight based on the charge generating meterial, i.e., the χ-form H2-Pc. When the amount is more than 3, the amount of the generating charge becomes small, and sensitivity of the photoconductive layer becomes poor. The charge generating layer is formed in a thickness of generally not more than 10 μm, preferably 0.05 to 5.0 μm. When the thickness is more than 10 μm, charge may readily be trapped, and sensitivity of the photoconductive layer becomes poor.

A charge transporting layer containing a charge transporter (CT material) is then formed on the charge generating layer. This layer may be formed in the same manner as described for forming the charge generating layer. That is, the charge transporter is dissolved in a solvent together with a binding resin, if necessary, and the resulting solution is uniformly applied on the charge generating layer, followed by drying.

Examples of the charge transporter include conventional materials such as oxadiazole derivative, pyrazoline derivative, pyrazole derivative, hydrazone derivative, quinazoline derivative, triarylamine derivative, triphenylenediamine derivative, carbazole derivative, indole derivative, imidazole derivative, styryl derivative, styryltriarylamine derivative, triazine derivative, butadiene derivative, and the like. Examples of the binding resin and solvent include the same materials as that employed for the charge generating layer.

The binding resin is employed in an amount of from 0.1 to 5 ratio by weight based on the charge transporter. When the amount is more than 5, concentration of the charge transporter in the charge transporting layer becomes small, and sensitivity of the photoconductive layer becomes poor. The charge transporting layer is preferably formed in a thickness of generally not more than 100 μm, preferably 5 to 50 μm.

EXAMPLES

The following Examples and Comparative Examples further illustrate the present invention in detail but are not to be construed to limit the scope thereof.

Synthesis Example 1

Synthesis of Crude H2-Pc

To a 1 L (litter) glass four-necked flask, 128.3 g of phthalonitrile, and 500 ml of amyl alcohol were charged and the apparatuses necessary to conduct a reaction such as a condenser are equipped. The inside of the flask is replaced with nitrogen, and thereto 170.0 g of DBU was added dropwise through a dropping funnel. After that, the mixture was stirred with refluxing for 5 hours.

The reaction product was immediately hot filtrated and washed with 600 ml of hot DMF. The resulting wet cake was re-dispersed in 500 ml of DMF, and stirred with refluxing for 2 hours. The product was hot filtrated and washed with 600 ml of hot DMF. The step of re-dispersing and washing was repeated two times. DMF was then replaced with 250 ml of methanol. After drying, 89.1 g of crude β-form H2-Pc was obtained.

The resulting crystallite was identified to H2-Pc by the elemental analysis and the IR analysis, and identified to the β-form by X-ray diffraction analysis. The results of the elemental analysis are shown in Table 1.

TABLE 1

|  | C | H | N |
|---|---|---|---|
| Theoretical value (%) | 74.70 | 3.50 | 21.79 |
| Calculated value (%) | 74.16 | 3.74 | 21.69 |

Synthesis Example 2

Synthesis of Amorphous-like α-form H2-Pc

The crude β-form H2-Pc (30.0 g) obtained in Synthesis Example 1, was dissolved in 1500 g of conc. sulfuric acid with keeping the temperature not more than 5° C., and the solution was stirred for 2 hours. Then, the resulting solution was poured in 0.8 L of ice/water with keeping the temperature not more than 10° C. The precipitated crystal was filtrated off, and the filtrate was washed completely with tap water and ion-exchanged water. After drying and powdering, 27.7 g of amorphous-like α-form H2-Pc was obtained. The crystallized degree of the resulting amorphous-like α-form H2-Pc was 44.1%.

The powdered XRD spectrum of the amorphous-like α-form H2-Pc was shown in FIG. 1. The XRD was measured by using the automatic X-ray diffraction apparatus MXP3™ manufactured by MAX SCIENCE Co., Ltd. The crystallized degree of the amorphous-like α-form H2-Pc is measured by using the multiplex peak separation method.

Figure 4:
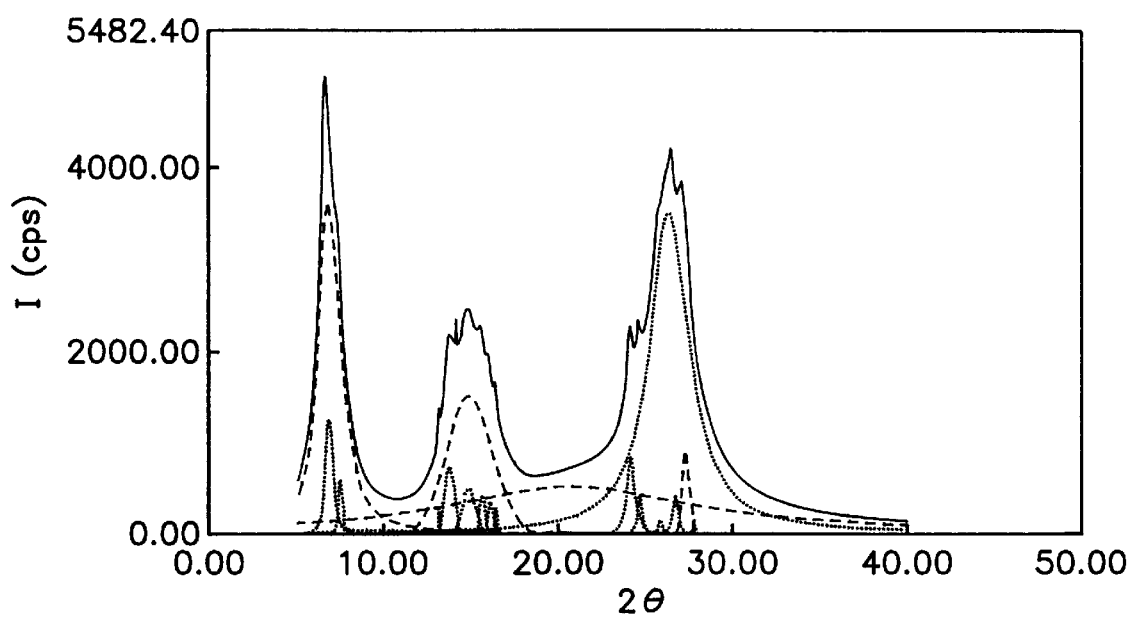
FIG. 4 shows the state in which the XRD spectrum of amorphous-like α-form H2-Pc of FIG. 1 is divided into the spectrum of the whole and the spectrum of the crystal part, by the multiplex peak separation method.
Figure 5:
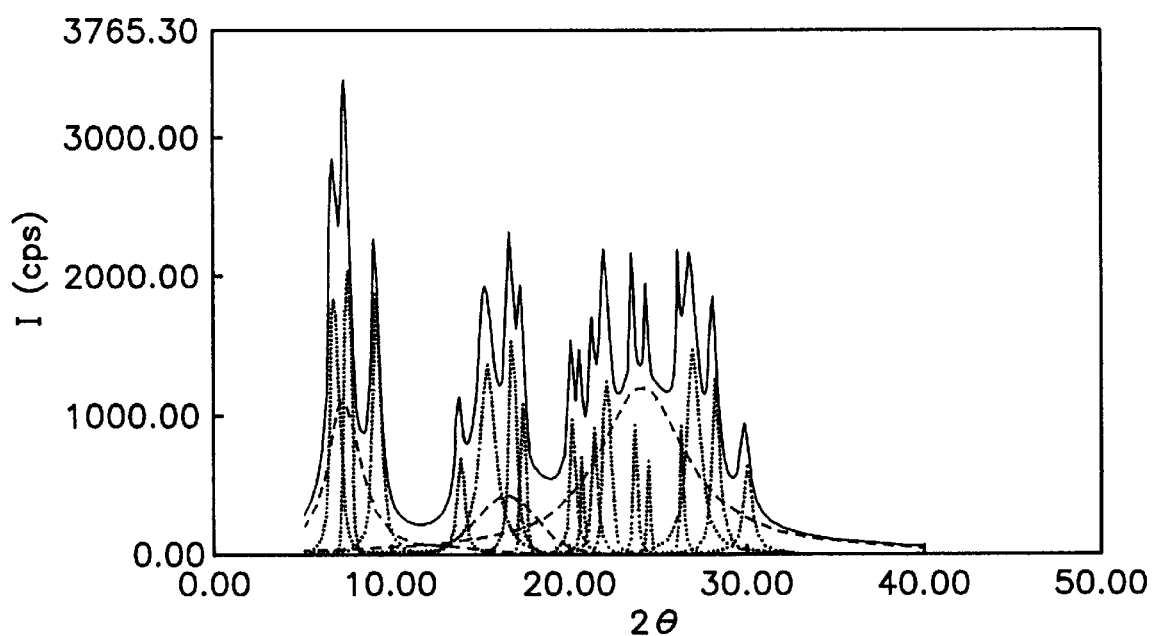
FIG. 5 shows the state in which the XRD spectrum of FIG. 3 is divided into the spectrum of the whole and the spectrum of the crystal part, by the multiplex peak separation method.

Specifically, the multiplex peak separation method was conducted as follows. The powder XRD spectrum shown in FIG. 1 was subjected to smoothing within the Bragg angle (2θ) range of from 5° to 40°. The spectrum as shown in the solid line of FIG. 4 was obtained. The peaks corresponding to the crystal moiety were divided from the solid line of FIG. 4. The divided peaks corresponding to the crystal moiety were shown in FIG. 4 as the short dotted line. The crystallized degree (%) was defined as follows: (The Sum of Intensity of the Peaks Corresponding to the Crystal Moiety/ The Sum of Intensity of the Whole Peaks)×100.

Example 1

The amorphous-like α-form H2-Pc (3.0 g) obtained in Synthesis Example 2 and 5 mmφ glass beads (120 g) were charged in an about 140 ml wide-mouthed bottle and the mixture was dry milled for 1 to 48 hours using a dispersing apparatus (paint shaker). During the step of dry milling, a part of the sample was taken out and the XRD spectrum of the sample was measured and found that a core of the χ-form H2-Pc is partially generated and grown in the polymorph system.

To the bottle was added 50 ml of N-methyl-2-pyrrolidone and the mixture was wet milled for 1 to 48 hours. A part of the sample was taken out and the XRD spectrum of the sample was measured and found that the sample was completely transformed to the χ-form H2-Pc.

The glass beads was thereafter separated by a filter cloth, the H2-Pc was filtrated through a membrane filter and dried to obtain 2.70 g of the χ-form H2-Pc.

Figure 2:
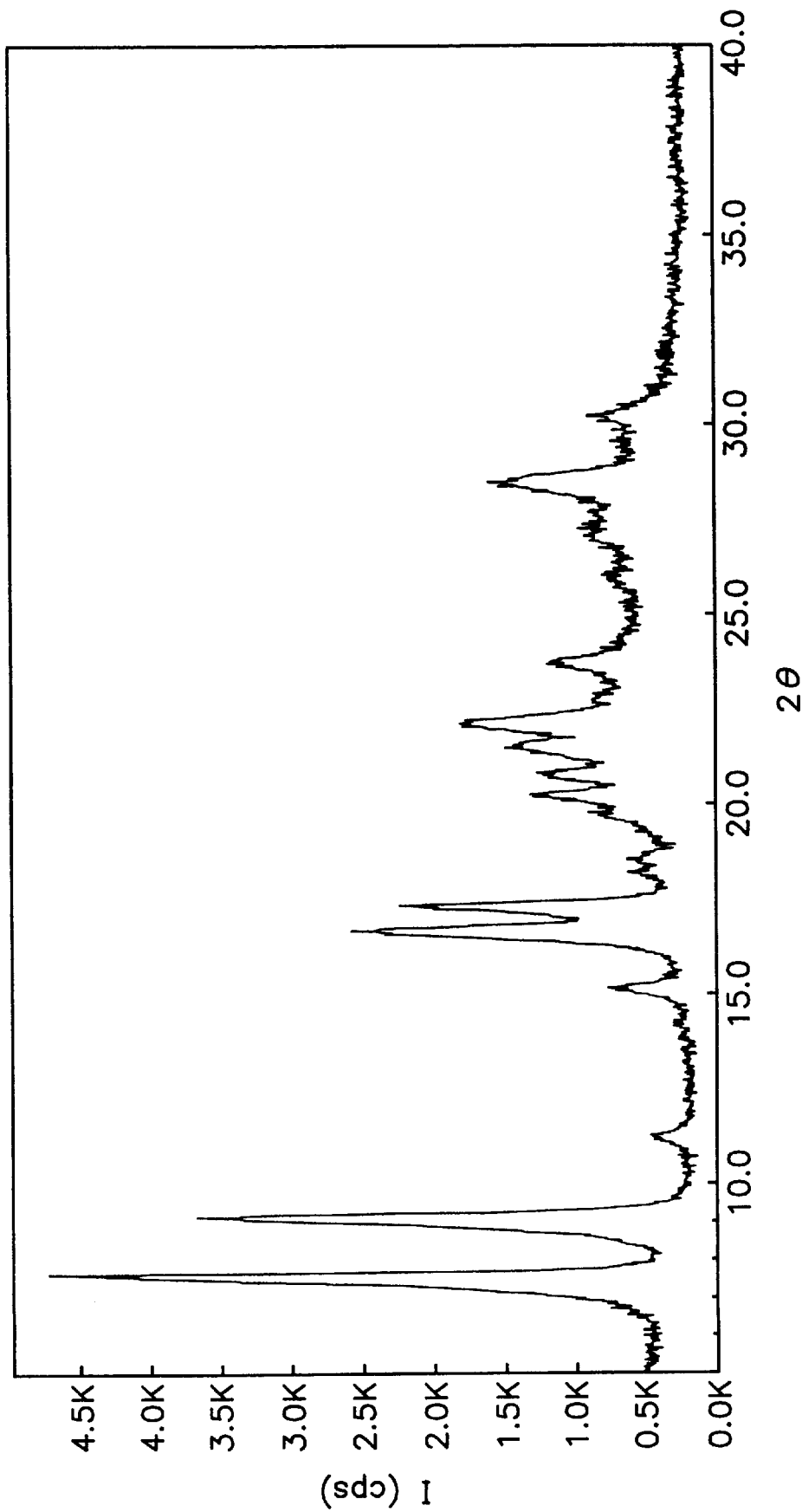
FIG. 2 is an XRD spectrum of χ-form H2-Pc, which is prepared in Examples 1 to 6.

The powder XRD spectrum of the χ-form H2-Pc was shown in FIG. 2. The powder XRD spectrum of the sample during dry milling which was in the way from "amorphous-like α-form" to "χ-form", was shown in FIG. 3.

Example 2

The χ-form H2-Pc (2.86 g) was prepared according to substantially the same manner as described in Example 1, except that N-methyl-2-piperidone was used as a solvent for the step of wet milling instead of N-methyl-pyrrolidone.

Example 3

The χ-form H2-Pc (2.70 g) was prepared according to substantially the same manner as described in Example 1, except that 2-pyrrolidone was used as a solvent for the step of wet milling instead of N-methyl-2-pyrrolidone.

Example 4

The χ-form H2-Pc (2.91 g) was prepared according to substantially the same manner as described in Example 1, except that N-(2-hydroxyethyl)-2-pyrrolidone was used as a solvent for the step of wet milling instead of N-methyl-2-pyrrolidone.

The following Examples 5 and 6 were conducted in order to confirm reproducibility of the process of the present invention, and of photoconductive properties of the organic photoreceptor prepared by using the same.

Example 5

The amorphous-like α-form H2-Pc was prepared according to the same manner as described in Synthesis Example 2, except that the β-form H2-Pc which was newly synthesized according to the process of Synthesis Example 1 (that is, the manufacture lot of the β-form H2-Pc is different), was used. The χ-form H2-Pc was prepared according to the same manner as described in Example 1 by using 3.0 g of the resulting amorphous-like α-form H2-Pc.

Example 6

The χ-form H2-Pc was prepared according to the same manner as described in Example 1, except that 3.0 g of the amorphous-like α-form H2-Pc which was newly synthesized according to the process of Synthesis Example 2 (that is, the manufacture lot of the amorphous-like α-form H2-Pc is different), was used.

Comparative Example 1

The amorphous-like α-form H2-Pc (3.0 g) obtained in Synthesis Example 2 was dry milled for 100 hours at room temperature according to substantially the same manner as described in Example 1. The polymorph of the sample was nearly transformed to χ-form H2-Pc (2.5 g) (Reference: Japanese Patent Kokoku Publication No. 14106/1969), but it still contains a few percent of the untransformed α-form H2-Pc. Photoconductive properties of the sample were shown in Table 3.

Comparative Example 2

The amorphous-like α-form H2-Pc (3.0 g) obtained in Synthesis Example 2 was dry milled for 5 hours, 50 g of methyl ethyl ketone (MEK) was added, and the mixture was wet milled for 5 hours according to substantially the same manner as described in Example 1 of Japanese Patent Kokoku Publication No. 37588/1995. The mixture was filtered out from MEK, and the wet cake was washed with 4% aqueous ammonium and methanol, and dried to obtain 2.1 g of the χ-form H2-Pc powder. Photoconductive properties of the sample were shown in Table 3.

Comparative Example 3

The crude β-form H2-Pc was synthesized according to substantially the same manner as described in Example 1 of Japanese Patent Kokoku Publication No. 85554/1993, and it was subjected to acid pasting to provide amorphous-like α-form H2-Pc. The amorphous-like α-form H2-Pc (3.0 g) was dry milled as described in Example 1 at 50° C. for 4 hours to obtain 1.9 g of the χ-form H2-Pc powder. The resulting sample was the mixture of the α-form and the χ-form as that described in Comparative Example 1. Photoconductive properties of the sample were shown in Table 3.

Comparative Example 4

The amorphous-like α-form H2-Pc was prepared according to Synthesis Example 2. The amorphous-like α-form H2-Pc was dry milled as described in Example 1 for 3 to 5 hours, 50 g of methanol was added, and the mixture was wet milled for 7 to 5 hours according to substantially the same manner as described in Japanese Patent Application No. 4423/1994 to obtain 4.1 g of the χ-form H2-Pc powder. The IR spectrum and the XRD spectrum of the powder were measured and found that the powder was completely converted to χ-form H2-Pc (FIG. 2).

Comparative Example 5

The amorphous-like α-form H2-Pc was prepared according to Comparative Example 4, it was dry milled for 3 to 5 hours, 50 g of THF instead of methanol used in Comparative Example 4, was added, and the mixture was wet milled for 7 to 5 hours to obtain 3.7 q of the χ-form H2-Pc powder. The IR spectrum and the XRD spectrum of the powder were measured and found that the powder was completely converted to χ-form H2-Pc (FIG. 2).

Comparative Example 6

The amorphous-like α-form H2-Pc was prepared according to Synthesis Example 2. The amorphous-like α-form H2-Pc (3.0 g) was dry milled as described in Example 1 for 17 hours, 50 g of DMF was added, and the mixture was wet milled for 16 hours to obtain 2.91 g of the χ-form H2-Pc powder. The IR spectrum and XRD spectrum of the powder were measured and found that the powder was converted to χ-form H2-Pc (FIG. 2).

The condition of the wet milling step employed in Examples 1 to 6 and Comparative Examples 1 to 6, and the resulting polymorph were summarized in the following Table 2.

TABLE 2

| Exam. | Solvent | Temp. | Hour | Polymorph |
|---|---|---|---|---|
| 1 | N-methyl-2-pyrrolidone | r.t. | 17 | χ-form |
| 2 | N-methyl-2-piperidone | r.t. | 17 | χ-form |
| 3 | 2-pyrrolidone | r.t. | 17 | χ-form |
| 4 | N-(2-hydroxyethyl)-2-pyrrolidone | r.t. | 35 | χ-form |
| 5 | N-methyl-2-pyrrolidone | r.t. | 17 | χ-form |

TABLE 2-continued

| Exam. | Solvent | Temp. | Hour | Polymorph |
|---|---|---|---|---|
| 6 | N-methyl-2-pyrrolidone | r.t. | 17 | χ-form |
| C-1 | — (dry milling) | r.t. | 100 | χ-form + α-form |
| C-2 | methyl ethyl ketone | r.t. | 5 | χ-form |
| C-3 | — (dry milling) | 50° C. | 4 | χ-form + α-form |
| C-4 | methanol | r.t. | 5 | χ-form |
| C-5 | tetrahydrofuran | r.t. | 5 | χ-form |
| C-6 | dimethylformamide | r.t. | 16 | χ-form |

Examples I to VI and Comparative Examples A to F

Preparation of Organic Photoreceptor

The χ-form H2-Pc (0.2 g) obtained in the Examples 1 to 6 and Comparative Examples 1 to 6 respectively, 0.2 g of the polyvinyl butyral resin (ELEX BH-3™ manufactured by SEKISUI KAGAKU K.K.), 59.6 g of cyclohexanone, and 50 g of 3 mmφ glass beads were charged in a wide-mouthed bottle, and were shaken for 1 hour using a paint shaker. The resulting mixture was applied on an aluminum plate using a bar coater and air-dried to form an charge generating layer having a thickness of about 0.5 μm.

Then, 4.5 g of 4-benzylamino-2-methylbenzaldehyde-1,1-diphenylhydrazone which is a charge transporter (CT material, CTC-191TM manufactured by TAKASAGO KORYO K.K.) and 4.5 g of the polycarbonate resin (PANLIGHT L-1250™ manufactured by TEIJIN LTD.), and 51.0 g of methylene chloride were charged in a wide-mouthed bottle, and were uniformly dispersed using ultrasound. The resulting mixture was applied on the charge generating layer using a bar coater and air-dried to form an charge transporting layer having a thickness of about 60 μm to obtain photoreceptor piece.

Evaluation of Primary Properties of Organic Photoreceptor

Photoconductive properties of the photoreceptor pieces corresponding to Examples I to VI and Comparative Examples A to F prepared as described above, were measured. A static electricity charging tester EPA-8200™ manufactured by KAWAGUCHI DENKI K.K. was used as the measuring apparatus.

The sample was corona charged at −8.0 kV in STAT 3 mode by first. It was then left in the dark for 2.5 seconds, and irradiated by 5.0 lux white light for 10.0 seconds. The charged potential (Vo), the sensitivity half-value irradiation amount $E_{1/2}$, the residual potential (Vr) were recorded. The results were shown in Table 3.

TABLE 3

| Exam. | CG | Vo (V) | Vr (V) | $E_{1/2}$ (Lux · sec) |
|---|---|---|---|---|
| I | Ex. 1 | −533.9 | −10.0 | 2.96 |
| II | Ex. 2 | −481.3 | −18.0 | 3.85 |
| III | Ex. 3 | −471.8 | −16.7 | 3.67 |
| IV | Ex. 4 | −494.3 | −6.7 | 3.23 |
| V | Ex. 5 | −580.3 | −11.7 | 2.95 |
| VI | Ex. 6 | −540.2 | −10.7 | 3.16 |
| C-A | CEx. 1 | −190.1 | −19.2 | 9.23 |
| C-B | CEx. 2 | −460.7 | −8.3 | 3.25 |
| C-C | CEx. 3 | −358.7 | −17.3 | 3.11 |

TABLE 3-continued

| Exam. | CG | Vo (V) | Vr (V) | E$_{1/2}$ (Lux · sec) |
|---|---|---|---|---|
| C-D | CEx. 4 | −266.7 | −11.0 | 3.95 |
| C-E | CEx. 5 | −366.7 | −7.3 | 3.53 |
| C-F | CEx. 6 | −294.0 | −16.3 | 3.96 |

The results of Table 3 show that the χ-form H2-Pc obtained according to the process of the present invention has excellent properties as a charge generating meterial for an organic photoreceptor, specifically has high photoconductivity.

Technical Effect of the Invention

According to the process of the present invention, the polymorph of the raw H2-Pc is completely transformed to "χ-form" by the combined steps of dry milling and wet milling in shorter period than that of the conventional process. Thereby, the cost for manufacturing the χ-form H2-Pc is remarkably reduced. Furthermore, the χ-form H2-Pc having improved photoconductivity is produced in the simple procedure.

The χ-form H2-Pc obtained by the process of the present invention is high-pure, and particularly excellent in electrophotographic properties. Therefore, it is extremely useful as a charge generating material for a photoreceptor of a copying machine or a printer using semi-conductor laser ray, and for a high-gamma photoreceptor of a digital copying machine.

What is claimed is:

1. A process for preparing χ-form metal free phthalocyanine comprising:
   dry milling amorphous-like α-form metal free phthalocyanine to form χ-form metal free phthalocyanine partially; and
   wet milling or dispersing with stirring the resulting polymorph mixture in the presence of a cyclic organic solvent comprising an amide moiety.

2. The process according to claim 1, wherein the cyclic organic solvent comprising an amide moiety has 4 to 20 carbon atoms.

3. The process according to claim 1, wherein the amide moiety has the structure of:

wherein R represents a hydrogen atom, an alkyl group having 1 to 5 carbon atoms, or a hydroxyalkyl group having 1 to 5 carbon atoms.

4. The process according to claim 1, wherein the cyclic organic solvent comprising an amide moiety is selected from the group consisting of N-methyl-2-pyrrolidone, N-(2-hydroxyethyl)-2-pyrrolidone, 2-pyrrolidone, 2-piperidone, N-methyl-2-piperidone, and 1,3-dimethyl-2-imidazolidinone.

5. The process according to claim 1, wherein the amorphous-like α-form metal free phthalocyanine is that which is prepared by acid pasting metal free phthalocyanine.

6. The process according to claim 5, wherein the metal free phthalocyanine is that which is prepared by the phthalonitrile method.

7. The process according to any one of claims 1 to 5, wherein said χ-form metal free phthalocyanine possesses a purity of not less than 99%.

* * * * *